US012649589B2

(12) United States Patent
Metts et al.

(10) Patent No.: US 12,649,589 B2
(45) Date of Patent: Jun. 9, 2026

(54) SPACE VEHICLE IMAGING STUDIO

(71) Applicant: Blue Origin Manufacturing, LLC, Huntsville, AL (US)

(72) Inventors: Jonathan Glen Metts, Austin, TX (US); Alice Clare Watts, North Bend, WA (US)

(73) Assignee: Blue Origin Manufacturing, LLC, Huntsville, AL (US)

( * ) Notice: Subject to any disclaimer, the term of this patent is extended or adjusted under 35 U.S.C. 154(b) by 324 days.

(21) Appl. No.: 18/315,765

(22) Filed: May 11, 2023

(65) Prior Publication Data

US 2024/0375798 A1    Nov. 14, 2024

(51) Int. Cl.
   *B64G 1/66*        (2006.01)
   *B64G 1/24*        (2006.01)

(52) U.S. Cl.
   CPC .............. *B64G 1/66* (2013.01); *B64G 1/244* (2019.05); *B64G 1/247* (2023.08)

(58) Field of Classification Search
None
See application file for complete search history.

(56) References Cited

U.S. PATENT DOCUMENTS

| | | | | |
|---|---|---|---|---|
| 3,029,867 | A | * | 4/1962 | Maurer ...................... E06B 3/94 |
| | | | | 160/84.09 |
| 5,124,938 | A | | 6/1992 | Algrain |
| 5,654,549 | A | | 8/1997 | Landecker et al. |
| 6,271,877 | B1 | | 8/2001 | Lecompte |
| 6,504,570 | B2 | | 1/2003 | Lecompte |
| 7,177,537 | B1 | * | 2/2007 | Adolphi ................. G03B 15/06 |
| | | | | 362/11 |
| 7,513,459 | B2 | | 4/2009 | Cepllina et al. |
| 9,684,673 | B2 | | 6/2017 | Beckett et al. |
| 10,378,895 | B2 | | 8/2019 | Cope et al. |
| 11,273,932 | B2 | * | 3/2022 | Faber ................... B64G 1/2227 |
| 12,037,142 | B2 | * | 7/2024 | Faber ...................... B64G 1/60 |
| 12,139,223 | B1 | * | 11/2024 | Yang ................... A63B 47/025 |
| 2002/0041328 | A1 | | 4/2002 | Lecompte et al. |
| 2015/0254738 | A1 | | 9/2015 | Wright, III et al. |
| 2018/0266169 | A1 | * | 9/2018 | Wray ...................... E05F 15/70 |
| 2019/0093347 | A1 | * | 3/2019 | Mizuno ................... E04B 2/825 |

FOREIGN PATENT DOCUMENTS

| | | |
|---|---|---|
| WO | 1986001592 | 3/1986 |
| WO | 2002018874 | 3/2002 |

* cited by examiner

*Primary Examiner* — Rodney E Fuller
(74) *Attorney, Agent, or Firm* — Summit Patents, PC

(57) ABSTRACT

Systems and methods for high performance, professional-grade photography and filmmaking in a spacecraft during space flights are provided. The systems may include an imaging studio, which is a partially enclosed volume within a spacecraft. The imaging studio may enable photography during microgravity coast phases of space flight while allowing astronauts to tend to non-photographic activities. The imaging studio may allow for commercially-valuable imagery that includes a background of an illuminated, curved Earth horizon. Imagery may also involve, among other things, a unique microgravity environment. Such imagery, without use of an imaging studio as described herein, may otherwise require artificial visual effects that may appear less realistic. Additionally, the novelty of capturing images during an actual space flight may itself be valuable.

18 Claims, 4 Drawing Sheets

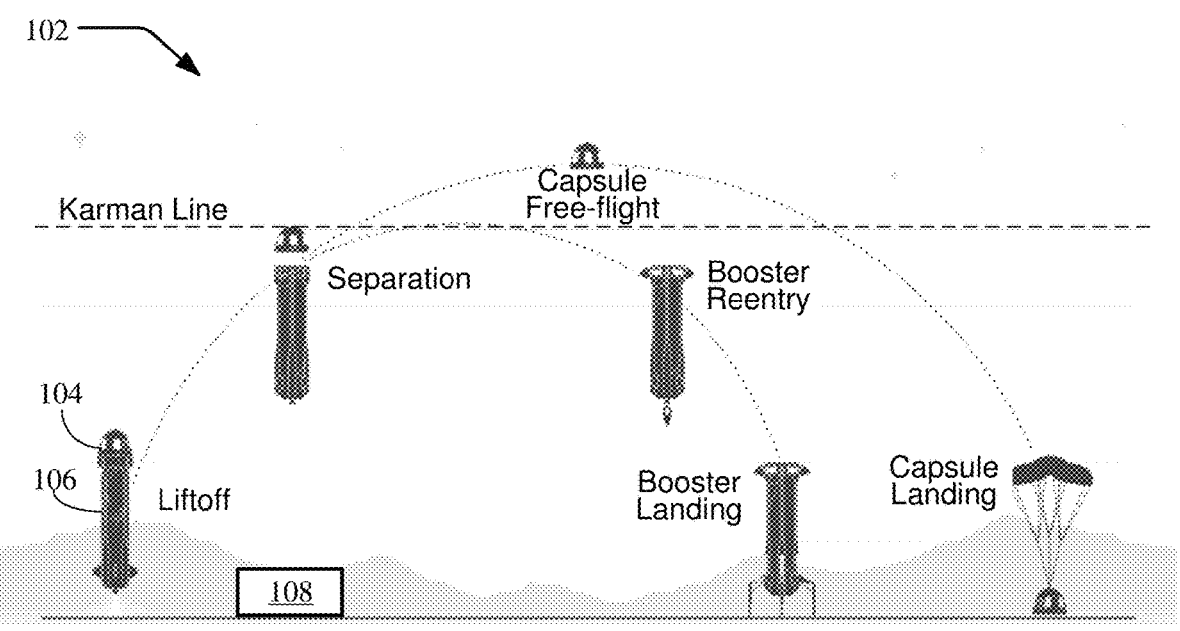
FIG. 1
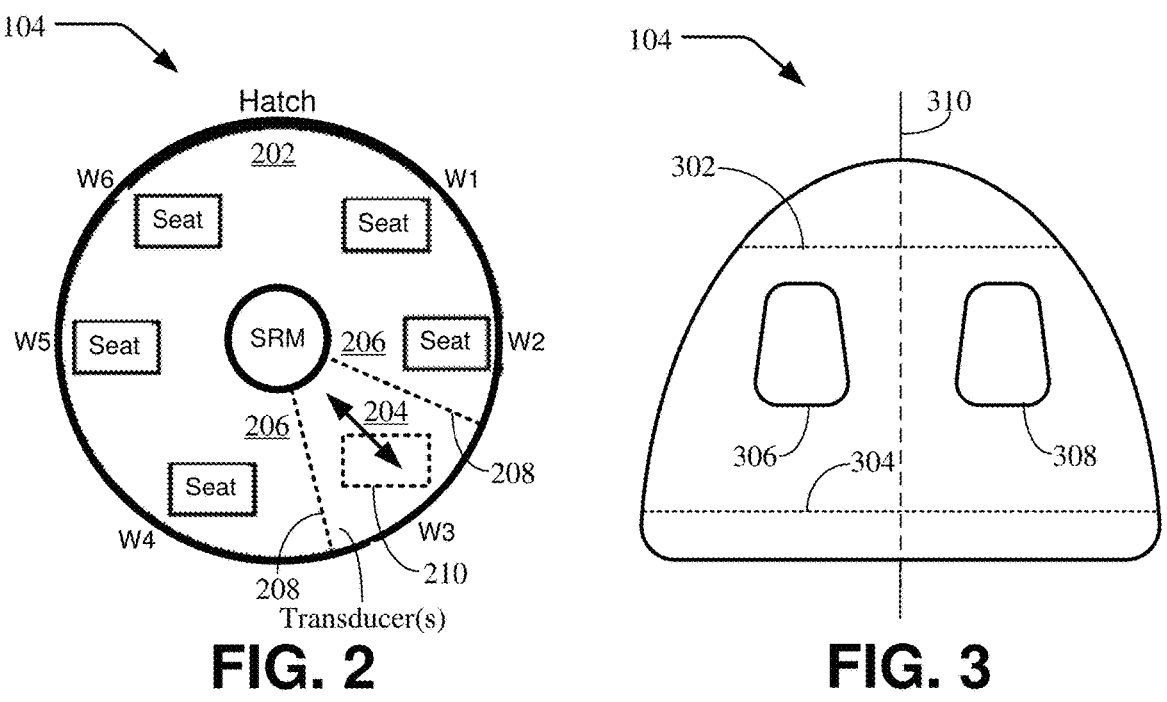
FIG. 2                 FIG. 3

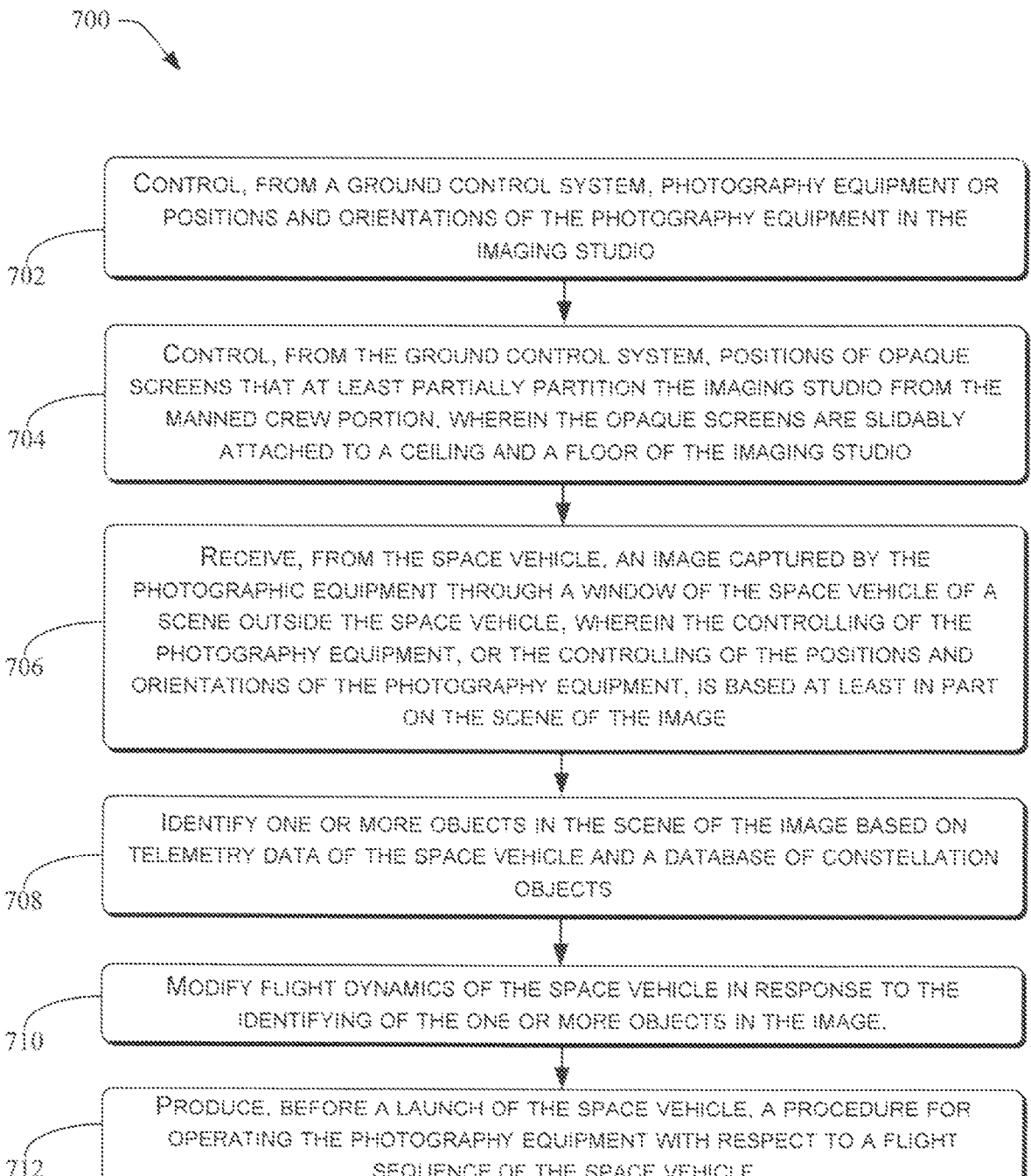

700 —

702 — CONTROL, FROM A GROUND CONTROL SYSTEM, PHOTOGRAPHY EQUIPMENT OR POSITIONS AND ORIENTATIONS OF THE PHOTOGRAPHY EQUIPMENT IN THE IMAGING STUDIO

704 — CONTROL, FROM THE GROUND CONTROL SYSTEM, POSITIONS OF OPAQUE SCREENS THAT AT LEAST PARTIALLY PARTITION THE IMAGING STUDIO FROM THE MANNED CREW PORTION, WHEREIN THE OPAQUE SCREENS ARE SLIDABLY ATTACHED TO A CEILING AND A FLOOR OF THE IMAGING STUDIO

706 — RECEIVE, FROM THE SPACE VEHICLE, AN IMAGE CAPTURED BY THE PHOTOGRAPHIC EQUIPMENT THROUGH A WINDOW OF THE SPACE VEHICLE OF A SCENE OUTSIDE THE SPACE VEHICLE, WHEREIN THE CONTROLLING OF THE PHOTOGRAPHY EQUIPMENT, OR THE CONTROLLING OF THE POSITIONS AND ORIENTATIONS OF THE PHOTOGRAPHY EQUIPMENT, IS BASED AT LEAST IN PART ON THE SCENE OF THE IMAGE

708 — IDENTIFY ONE OR MORE OBJECTS IN THE SCENE OF THE IMAGE BASED ON TELEMETRY DATA OF THE SPACE VEHICLE AND A DATABASE OF CONSTELLATION OBJECTS

710 — MODIFY FLIGHT DYNAMICS OF THE SPACE VEHICLE IN RESPONSE TO THE IDENTIFYING OF THE ONE OR MORE OBJECTS IN THE IMAGE.

712 — PRODUCE, BEFORE A LAUNCH OF THE SPACE VEHICLE, A PROCEDURE FOR OPERATING THE PHOTOGRAPHY EQUIPMENT WITH RESPECT TO A FLIGHT SEQUENCE OF THE SPACE VEHICLE

FIG. 7

SPACE VEHICLE IMAGING STUDIO

BACKGROUND

As is well known, the cost of spaceflight is extremely high. For example, carrying a payload into space, whether the payload is a crew member, passenger, a satellite, or other type of equipment, is very expensive. Therefore, it is unlikely that photography alone would warrant a spaceflight mission. Instead, a spaceflight mission may have other goals, wherein capturing still or video images from a lower orbit above Earth or beyond is more likely to be a secondary priority or consideration. Even so, such photography may be important. In flights where passengers (or crew) are aboard a spacecraft, activities involving photography may readily interfere with other activities or may inconvenience the passengers (except, perhaps the passenger performing the photography, who may experience distractions or interferences from the other passengers).

Besides the interference and inconvenience that spacecraft photographic activities may pose on passengers, such photography is inherently difficult for a number of reasons. For example, a desired shot may be difficult to capture because the target may only briefly appear in view through a window of the travelling space vehicle. As another example, passengers may have trouble taking photos or video in zero-gravity, which itself may be a serious distraction.

Thus, addressing the issues mentioned above may involve, among other things, high performance photography that does not inconvenience passengers or interfere with their activities.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 1 is a schematic view of a flight of a space vehicle, according to some embodiments.

FIG. 2 is a schematic plan view of a crew cabin of a space vehicle, according to some embodiments.

FIG. 3 is a schematic side view of a space vehicle, according to some embodiments.

FIG. 7 is a flow diagram of a process for operating a space vehicle, according to some embodiments.

DETAILED DESCRIPTION

Figure 4:
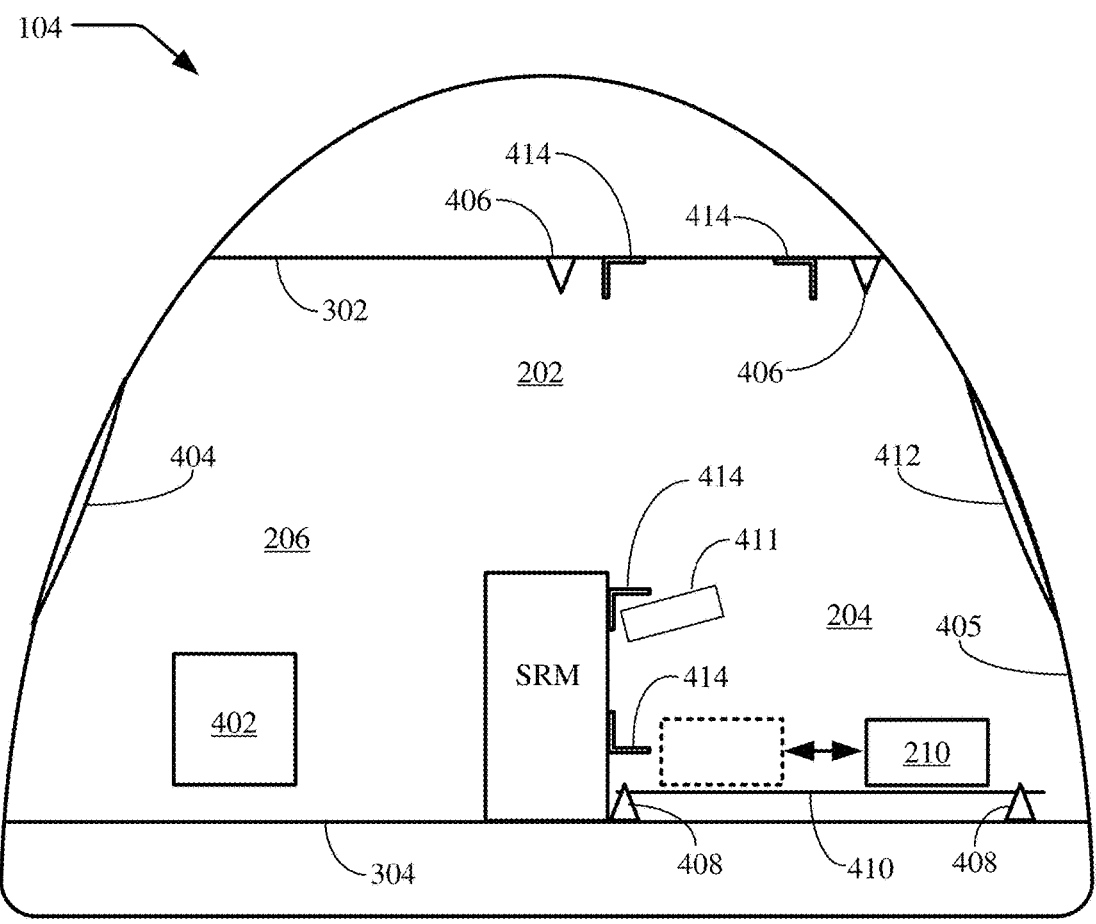
FIG. 4 is a schematic side view illustrating various sections of a crew cabin of a space vehicle, according to some embodiments.

This disclosure describes systems and methods for, among other things, high performance, professional-grade photography and filmmaking in a spacecraft during space flights. In some embodiments, the systems may include an imaging studio, which is a partially enclosed volume within a spacecraft. The imaging studio may enable photography during microgravity coast phases of space flight while allowing astronauts (e.g., passengers or crew) to tend to non-photographic activities.

The imaging studio may allow for producing commercially-valuable imagery that includes a background of an illuminated, curved Earth horizon, for example. Imagery may also involve, among other things, a unique microgravity environment. Such imagery, without use of an imaging studio as described herein, may otherwise require artificial visual effects that may appear less realistic. Additionally, the novelty of capturing images during an actual space flight may itself be valuable.

For example, some embodiments enable still and video photography of a passenger with the window's view as background. The background may include the curved Earth horizon, moon, stars, and other objects that may invoke a heightened interest of an observer based on the vantage of space. Such still and video photography may be useful for a product advertisement or some kind of performance (e.g., footage in a music video).

The imaging studio provides a number of advantages. For example, the imaging studio provides environmental control (e.g., lighting, sound, isolation), electronic interfaces (e.g., vehicle power and/or telemetry), vehicle orientation control, and isolation from (other) astronauts to facilitate commercially viable photo/video content creation during actual space flight.

In some embodiments, an imaging studio inside a space vehicle includes, among other things, a window to provide a view of outside the space vehicle from inside the imaging studio, fasteners to attach photographic equipment to various portions of the imaging studio, and opaque screens or partitions to block light to and from the imaging studio. Herein, "fasteners" includes clips, hook-and-loop fasteners, bolts, adhesives, clamps, brackets, screws, among other things (and combinations thereof), and any of a number of mounting hardware or mechanisms. The space vehicle may be partitioned into the imaging studio and the remaining portion of the astronaut capsule. The opaque screens, which may act as the partitioning, may extend substantially from a ceiling of the imaging studio to a floor of the imaging studio. The opaque screens partition the imaging studio from other portions of the inside of the space vehicle. The imaging studio may also include a transceiver to receive commands from a ground control system on Earth's surface. For example, the commands may control the photographic equipment or positions and orientations of the photographic equipment. The imaging studio may also include transducers to impart movement of the opaque screens based on the commands. For example, the opaque screens may be slidable, thereby opening or closing the space of the imaging studio to other parts of the space vehicle.

In some implementations, the imaging studio may include a control system to at least partially control flight dynamics of the space vehicle. Such control may be based on commands received by the transceiver. The flight dynamics may comprise trajectory or rotation of the space vehicle about an axis of symmetry of the space vehicle so as to change the view of outside the space vehicle. In other words, the view outside each window of the space vehicle changes as the space vehicle rotates.

In some implementations, the imaging studio may further include a ballast mounted and slidable on a rail. The location of the ballast on the rail may be based on flight dynamics (e.g., trajectory) of the space vehicle or operations of the photographic equipment, as explained below. The photographic equipment may include one or more cameras and lights that are compatible with the space vehicle with respect to mounting method, weight, and electromagnetic interference.

In some embodiments, a space vehicle may comprise a crew capsule partitioned into a crew portion and an imaging studio portion. For example, the crew capsule may be launched atop a rocket launch vehicle. The crew capsule may include windows, at least one of which provides a view of outside the space vehicle from inside the imaging studio portion. The imaging studio portion may include fasteners to attach photographic equipment to various parts of the imaging studio portion. Opaque screens may be slidably attached to a ceiling and a floor of the imaging studio portion to block light, and perhaps sound, between the crew portion and the imaging studio portion.

The space vehicle may further comprise a transceiver to receive commands from a ground control system. The photographic equipment or positions and orientations of the photographic equipment may be responsive to the commands. Positions of the opaque screens may also be responsive to commands from the ground control system.

In some embodiments, the transceiver in the space vehicle may transmit images of the view, as captured by the photographic equipment, of outside the space vehicle. The space vehicle may include a flight control system to at least partially control flight dynamics of the space vehicle to adjust the view of outside the space vehicle. The flight control system may be responsive to the commands and the commands may be responsive to identification of objects in an image, captured by the photographic equipment, of the view of outside the space vehicle. The flight dynamics may be rotation of the space vehicle about an axis of symmetry of the space vehicle. For example, small rocket thrusters may be used to alter motion and/or orientation of the space vehicle.

In some embodiments, a method of operating a space vehicle that includes an imaging studio and a crewed portion adjacent to the imaging studio includes i) controlling, from a ground control system, photographic equipment or positions and orientations of the photographic equipment in the imaging studio, and ii) controlling, from the ground control system, positions of opaque screens that at least partially partition the imaging studio from the crewed portion. The opaque screens may be slidably attached to a ceiling and a floor of the imaging studio. The method may further include receiving, from the space vehicle via the photographic equipment, an image captured through a window of the space vehicle of a scene outside the space vehicle. The controlling of the photographic equipment, or the controlling of the positions and orientations of the photographic equipment, may be based at least in part on the scene of the image.

The method may further include i) identifying one or more objects in the scene of the image based on telemetry data of the space vehicle and a database of landscape or astronomical objects, ii) modifying control flight dynamics of the space vehicle in response to the identifying of the one or more objects in the image, and iii) producing, before a launch of the space vehicle, a procedure for operating the photographic equipment with respect to a flight sequence of the space vehicle. For example, captured images or video of the surface landscape of Earth or astronomical objects visible through the space vehicle windows may be analyzed during or between missions using AI algorithms (or other analysis tools) to provide at least an approximate mapping/ timeline for background imagery of subsequent photos or video.

FIG. 1 is a schematic view of a flight 102 of a space vehicle (capsule) 104 atop a propulsion module (booster rocket) 106, according to some embodiments. For example, flight 102 may be the same as or similar to flights of the New Shepard suborbital vehicle by Blue Origin. Claimed subject matter and embodiments described herein, however, are not so limited. Embodiments described herein may be applied to other suborbital vehicles as well as orbital vehicles that travel in high-Earth orbit and beyond.

Subsequent to preflight activities, flight 102 may begin with liftoff of space vehicle 104 and propulsion module 106. Some minutes later, space vehicle 104 separates from propulsion module 106. Space vehicle 104, having propulsion capabilities, continues to climb past the Karman line (100 kilometers, 330,000 feet above Earth's mean sea level), which is the internationally recognized boundary of space. Meanwhile, propulsion module 106 falls back to Earth in a booster reentry phase, eventually landing.

Space vehicle 104 eventually reaches its maximum distance from Earth during free-flight (e.g., no rocket propulsion) in micro-gravity (hereinafter referred to by the approximation "zero-gravity"). Space vehicle 104 may be in zero-gravity for several minutes before falling back toward Earth and out of zero-gravity. This several-minute period is herein called "free-flight," during which photography may be most desired. Finally, flight 102 ends when space vehicle 104 lands on Earth's surface.

Space vehicle 104 may carry crew or passengers (collectively referred to as "astronauts"). In various implementations described herein, space vehicle 104 may be autonomously or remotely controlled so that only passengers are on board (e.g., no crew). Thus, flight 102 and space vehicle 104 may be configured for space tourism, rendering photography to be an important part of the flight mission. Even so, each passenger desires a unique flight experience, which may not involve photography. Accordingly, an aspect of embodiments described herein is an imaging studio that allows for high-performance photography during a flight mission, such as flight 102, without detrimentally affecting the experiences of (other) passengers. Vice versa, such an imaging studio helps prevent the (other) passengers' activities from detrimentally affecting photography activities.

In various embodiments, the imaging studio may operate based on pre-flight input and/or real-time control of space vehicle 104 from a ground control system 108. For example, pre-flight input may comprise a mission algorithm to be sequentially followed during flight. The algorithm may involve time-based flight dynamics of the space vehicle, such as spin orientation (e.g., rotation about the central axis of the space vehicle) for passenger-requested visibility of Earth or other desired imagery through a window of space vehicle 104 (e.g., the window located in the imaging studio). Such time-based flight dynamics of the space vehicle may also be controlled remotely in real-time.

FIG. 2 is a schematic plan view of a passenger (or crew) cabin 202 of space vehicle 104, according to some embodiments. Cabin 202 may include seats and corresponding windows W1-W6 for passengers. A solid rocket motor (SRM) propulsion system may be located in the center of cabin 202, which may be partitioned into an imaging studio 204 and the remaining portion, herein referred to as a passenger portion 206. Opaque screens or other type of partitions may be used for partitioning 208 and may extend substantially from a ceiling of imaging studio 204 to a floor of the imaging studio. The opaque screens may partition imaging studio 204 from passenger portion 206.

Imaging studio 204 may include a seat similar to or the same as seats in passenger portion 206. In other implementations, imaging studio 204 may include a ballast 210 instead of a seat. The ballast may be important to maintain design criteria of flight dynamics of space vehicle 104. For example, the space vehicle may be configured for the weight of six seats and six passengers in the seats. The missing weight of a seat and passenger in imaging studio 204 may adversely affect flight dynamics of space vehicle 104. Thus, ballast 210 may be placed in the imaging studio to compensate for the missing weight of a seat and passenger. In some implementations, however, a seat and passenger may be present in imaging studio 204, and a ballast need not be necessary. In some implementations, ballast 210 may be slidably mounted on a rail so as to be moveable in a direction of the double-ended arrow in the figure, for example. Such movement may be useful to allow for accommodations of various photographic equipment or for tuning mass distribution for flight dynamics of space vehicle 104. Ballast 210 may be moved using transducers, as with the sliding screens mentioned above, and may be moved automatically at certain times within the mission profile, for example.

As mentioned above, each seat has a corresponding window. Imaging studio 204 includes window W3, though there need not be a corresponding seat (instead, there may be a ballast). Photographic equipment placed in imaging studio 204 may capture images of outside space vehicle 104 through window W3. The seat and window configuration, as well as details of imaging studio 204, are merely examples, and claimed subject matter is not limited to these examples.

FIG. 3 is a schematic side view of space vehicle 104, according to some embodiments. Imaging studio 204 and passenger portion 206, which are inside space vehicle 104, include a ceiling 302 and a floor 304. Passenger portion 206 may include a window 306 (e.g., W4) and imaging studio 204 may include a window 308 (e.g., W3). Flight dynamics may comprise rotation of space vehicle 104 about an axis of symmetry 310 of the space vehicle.

FIG. 4 is a schematic side view illustrating various sections of cabin 202, which includes imaging studio 204 and passenger portion 206 of space vehicle 104, according to some embodiments. Passenger portion 206 may include seats 402 and corresponding windows 404 (e.g., W1, W2 and W4-W6) for passengers. The solid rocket motor (SRM) propulsion system may be located in the center region of cabin 202. Partitioning 208, which may be opaque screens, may be slidable so as to extend a span between bulkhead 405 and a central region above or near the SRM. For example, the partitioning may be isolation curtains that can be gathered up against the bulkhead during ascent/descent of flight 102. The isolation curtains may substantially block light and sound between imaging studio 204 and passenger portion 206. Such isolation curtains may be stretched out (e.g., extended) to curtain mounts near the SRM during coast (e.g., the zero-gravity phases of flight 102). To allow for such extension and contraction, partitioning 208 may be attached to slidable brackets 406 or a rail on ceiling 302 of imaging studio 204. Partitioning 208 may also be attached to slidable brackets 408 or a rail on floor 304 of the imaging studio. For example, brackets 406 and 408 may be carabiner-style clips attached to a rail system.

As mentioned above, imaging studio 204 may include a seat similar to or the same as seats 402 in passenger portion 206. In other implementations, imaging studio 204 may include ballast 210. In some implementations, however, a seat and passenger may be present in imaging studio 204, and a ballast need not be necessary. In some implementations, ballast 210 may be slidably mounted on a rail 410 so as to be moveable in a direction of the double-ended arrow in the figure, for example. Such movement may be useful to allow for accommodations of various photographic equipment 411 or for tuning mass distribution for flight dynamics of space vehicle 104. For example, the effect of the ballast and its placement on flight dynamics in zero-gravity may be different in substantial gravity. Accordingly, placement of ballast 210 where a passenger seat may otherwise be located may be important for flight dynamics. But such a placement of the ballast may not be important in zero-gravity during free-flight, so that the ballast may be moved to another location to accommodate photographic equipment, or the performance thereof, without adversely affecting flight dynamics.

Imaging studio 204 includes a window 412 (e.g., W3). Photographic equipment placed in imaging studio 204 may capture images of outside space vehicle 104 through window 412. Imaging studio 204 may include various brackets 414, only some of which are illustrated in the figure as examples, for mounting photographic equipment. Claimed subject matter is not limited to any particular type of bracket and is not limited to any particular locations of placement in imaging studio 204. As mentioned above, the seat and window configurations, as well as details of imaging studio 204 and passenger portion 206, are merely examples, and claimed subject matter is not limited to these examples.

Photographic equipment may include still and video cameras, lighting, light meters, and microphones, just to name a few examples. In some implementations, photographic equipment may be dedicated to imaging studio 204. In other implementations, producers (e.g., photographers or videographers) may bring their own photographic equipment aboard space vehicle 104 and place it in imaging studio 204. In such implementations, the photographic equipment may be required to be pre-approved for compatibility with mounting features (e.g., brackets 414) as well as with the space vehicle. For example, for a particular flight, weight, stored electrical power, combustibility, and electromagnetic interference of the photographic equipment may be required to be compatible with the space vehicle for the flight.

Figure 5:
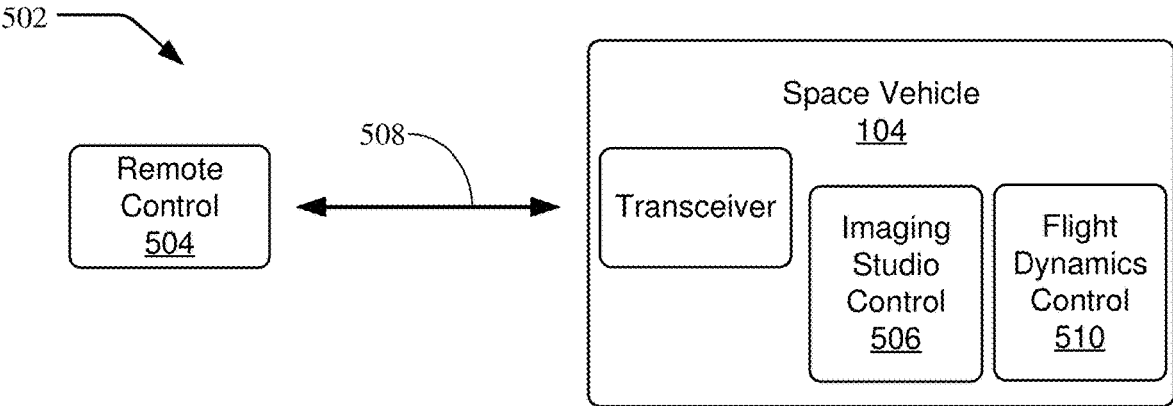
FIG. 5 is a block diagram of control systems for operating a space vehicle, according to some embodiments.

FIG. 5 is a block diagram of control systems 502 for operating space vehicle 104, according to some embodiments. A remote control system 504, either located on Earth (e.g., ground control system 108) or on a space-based vehicle (e.g., a space station or artificial satellite) that is remote from space vehicle 104, may remotely operate positions (e.g., extent) of partitioning 208, photographic equipment 411, or positions and orientations of the photographic equipment in imaging studio 204. For example, remote control system 504 may transmit commands to an imaging studio control system 506 via a wireless communication signal 508. A transceiver on board space vehicle 104 may receive the wireless communication signal. The commands may include instructions for operating positions of partitioning 208 and/or photographic equipment 411.

In some implementations, the transceiver on board space vehicle 104 may transmit, via the wireless communication signal, an image of a scene outside the space vehicle. Photographic equipment 411, having a view through a window (e.g., 412) of the space vehicle may capture such an image. Subsequent to processing the image, as discussed below, remote control system 504 may transmit commands to imaging studio control system 506. The commands, which may be based at least in part on the scene (or objects therein) of the image, may include instructions for controlling photographic equipment 411 and/or positions and orientations thereof.

In some embodiments, remote control system 504 may identify one or more objects in the scene of the image based on telemetry data of the space vehicle and a database of landscape or astronomical objects. For example, the telemetry data and the database may provide information that allows a determination, by the control system, of objects captured in the scene. Such objects may be Earth's horizon, objects orbiting Earth, or may be the sun, stars, planets, and so on. These objects have predictable motions and locations and thus may be identified. Photographic equipment 411, based on knowledge of motions and locations, may be controlled by any part of control systems 502 to capture images of any of such objects. For example, photographic equipment 411 may be programmed (e.g., configured) to capture an image of Earth's horizon during a particular part of flight 102 when it is predicted that Earth's horizon will be visible through the window of the imaging studio.

In some embodiments, remote control system 504 may modify control flight dynamics of space vehicle 104 in response to identifying one or more objects in the image. For example, remote control system 504 may transmit commands to a flight dynamics control system 510 via wireless communication signal 508. These commands may include instructions for controlling flight dynamics of the space vehicle, such as its position or orientation. For example, the flight dynamics may involve rotation of the space vehicle about axis 310 of the space vehicle.

In some implementations, a procedure for operating the photographic equipment with respect to a flight sequence of the space vehicle may be prepared before a launch of the space vehicle. For example, actions of photographic equipment 411 may be programmed (e.g., configured) to be performed during a future flight of the space vehicle. A procedure of operations (e.g., the actions) may be stored in a memory of remote control system 504 or imaging studio control system 506.

Figure 6:
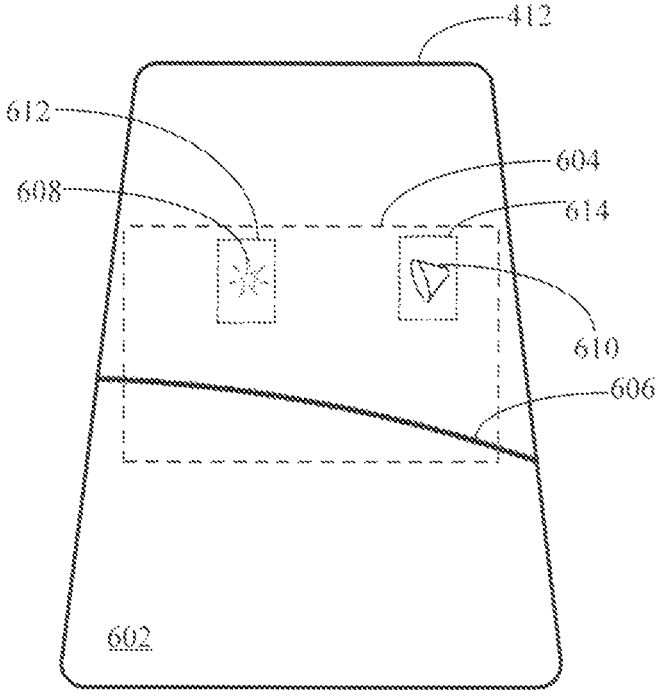
FIG. 6 is a schematic view of a scene through a window of outside a space vehicle, according to some embodiments.

FIG. 6 is a schematic illustration of an example view 602 through window 412 of space vehicle 104, according to some embodiments. Within view 602 is a scene 604, which encompasses the field of view of a camera that is part of photographic equipment 411. For example, view 602 is what a passenger would see looking out window 412, and scene 604 corresponds to images captured by the camera aimed to "look" out the window.

In various embodiments, for identifying and locating objects, image processing (e.g., computer vision) may be applied to scene 604 captured as an image by photographic equipment 411. For example, the example scene 604 includes Earth's horizon 606, a star 608, and another space vehicle 610. Identifying such objects in a scene may allow photographic equipment to capture desired images of particular objects. Image processing, in addition to identifying objects of interest in an image, may also determine their positions. A bounding box may be used to describe the spatial location of an object. For example, image processing may generate a bounding box 612 around star 608 and a bounding box 614 around space vehicle 610. As a result of identifying and locating objects of interest in a scene of an image, image processing, which may be performed by any of control systems 502, may allow for photographic equipment 411 to automatically (e.g., with no human interaction) capture images of such objects. For example, if an image of Earth's horizon is a priori desired, then when Earth's image appears in scene 604 (e.g., as a result of space vehicle 104 rotating into such alignment) photographic equipment 411 may zoom in or out to capture the image or begin a video capture. In some implementations, flight dynamics control system 510 may modify or affect flight dynamics of space vehicle 104 so that a view out window 412 (e.g., scene 604) will include an object that is desired to be in an image. For example, if a goal is to capture video of star 608, which is presently out of view 602, flight dynamics control system 510 may rotate space vehicle 104 until the image processor identifies star 608 in scene 604. Consequently, photographic equipment 411 may capture video of the star.

FIG. 7 is a flow diagram of a process 700 for operating space vehicle 104, according to some embodiments. Remote control system 504 may perform all or portions of process 700. At 702, remote control system 504 may control photographic equipment or positions and orientations of the photographic equipment in an imaging studio of the space vehicle. At 704, the remote control system may control positions of opaque screens (e.g., partitioning 208) that at least partially partition the imaging studio from a crewed (or passenger) portion of the space vehicle. The opaque screens may be slidably attached to a ceiling and a floor of the imaging studio. At 706, the remote control system may receive, from the space vehicle, an image captured by the photographic equipment through a window of the space vehicle of a scene outside the space vehicle. The controlling of the photographic equipment, or the controlling of the positions and orientations of the photographic equipment, may be based at least in part on the scene of the image. At 708, the remote control system may identify one or more objects in the scene of the image based on telemetry data of the space vehicle and a database of landscape or astronomical objects. At 710, the remote control system may modify control flight dynamics of the space vehicle in response to the identifying of the one or more objects in the image. The flight dynamics may comprise rotation of the space vehicle about an axis of symmetry of the space vehicle. In some embodiments, at 712, the remote control system may produce, before a launch of the space vehicle, a procedure for operating the photographic equipment with respect to a flight sequence of the space vehicle. For example, an operating procedure may include instructions for capturing images of particular objects that are expected to be visible from a window of the space vehicle during flight.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific embodiments or examples are presented by way of examples for purposes of illustration and description. They are not intended to be exhaustive of or to limit this disclosure to the precise forms described. Many modifications and variations are possible in view of the above teachings. The embodiments or examples are shown and described in order to best explain the principles of this disclosure and practical applications, to thereby enable others skilled in the art to best utilize this disclosure and various embodiments or examples with various modifications as are suited to the particular use contemplated. It is intended that the scope of this disclosure be defined by the following claims and their equivalents.

We claim as follows:

1. An imaging studio inside a space vehicle, the imaging studio comprising:
   a window to provide a view of outside the space vehicle from inside the imaging studio;

US 12,649,589 B2

9 fasteners to attach photographic equipment to portions of the imaging studio;

a ballast slidably mounted on a rail, wherein a location of the ballast on the rail is based on flight dynamics of the space vehicle or operations of the photographic equipment; and opaque screens to block light to and from the imaging studio, wherein the opaque screens extend substantially from a ceiling of the imaging studio to a floor of the imaging studio, and wherein the opaque screens partition the imaging studio from other portions of the inside of the space vehicle.

2. The imaging studio of claim 1, further comprising a transceiver to receive commands from a ground control system, wherein the commands control the photographic equipment or positions and orientations of the photographic equipment.

3. The imaging studio of claim 2, further comprising transducers to impart movement of the opaque screens based on the commands.

4. The imaging studio of claim 2, further comprising a control system to at least partially control flight dynamics of the space vehicle based on the commands.

5. The imaging studio of claim 1, further comprising a control system to at least partially control flight dynamics of the space vehicle.

6. The imaging studio of claim 5, wherein the flight dynamics comprise rotation of the space vehicle about an axis of symmetry of the space vehicle so as to change the view of outside the space vehicle from one or more windows of the space vehicle.

7. The imaging studio of claim 1, wherein the photographic equipment comprises one or more cameras and lights that are compatible with the space vehicle with respect to mounting method, weight, and electromagnetic interference.

8. A space vehicle comprising:

a crew capsule partitioned into a crew portion and an imaging studio portion;

a window to provide a view of outside the space vehicle from inside the imaging studio portion;

fasteners to attach photographic equipment to parts of the imaging studio portion;

a ballast, which is slidably mounted on a rail and moveable by a transducer, in the imaging studio portion, wherein a location of the ballast on the rail is based on flight dynamics of the space vehicle or operations of the photographic equipment; and opaque screens to block light between the crew portion and the imaging studio portion, wherein the opaque screens are slidably attached to a ceiling and a floor of the imaging studio portion.

9. The space vehicle of claim 8, further comprising a transceiver to receive commands from a ground control system, wherein the photographic equipment or positions and orientations of the photographic equipment are responsive to the commands.

10

10. The space vehicle of claim 8, further comprising a transceiver to receive commands from a ground control system, wherein positions of the opaque screens are responsive to the commands.

11. The space vehicle of claim 8, further comprising:

a transceiver to receive commands from a ground control system, and transmit images of the view of outside the space vehicle; and a flight control system to at least partially control flight dynamics of the space vehicle to adjust the view of outside the space vehicle, wherein the flight control system is responsive to the commands and the commands are responsive to an image of the view of outside the space vehicle, wherein the image is captured by the photographic equipment.

12. The space vehicle of claim 11, wherein the flight dynamics comprise rotation of the space vehicle about an axis of symmetry of the space vehicle.

13. A method of operating a space vehicle that includes an imaging studio and a crewed portion adjacent to the imaging studio, the method comprising:

controlling, from a ground control system, photographic equipment or positions and orientations of the photographic equipment in the imaging studio;

controlling, from the ground control system, positions of opaque screens that at least partially partition the imaging studio from the crewed portion, wherein the opaque screens are slidably attached to a ceiling and a floor of the imaging studio; and controlling a ballast disposed in the imaging studio and slidably mounted on a rail, including positioning the ballast along the rail based on flight dynamics of the space vehicle or to accommodate operations of the photographic equipment.

14. The method of claim 13, further comprising:

receiving, from the space vehicle, an image captured by the photographic equipment through a window of the space vehicle of a scene outside the space vehicle, wherein the controlling of the photographic equipment, or the controlling of the positions and orientations of the photographic equipment, is based at least in part on the scene of the image.

15. The method of claim 14, further comprising:

identifying one or more objects in the scene of the image based on telemetry data of the space vehicle and a database of landscape or astronomical objects.

16. The method of claim 15, further comprising:

modifying flight dynamics of the space vehicle in response to the identifying of the one or more objects in the image.

17. The method of claim 16, wherein the flight dynamics comprise rotation of the space vehicle about an axis of symmetry of the space vehicle.

18. The method of claim 13, further comprising:

producing, before a launch of the space vehicle, a procedure for operating the photographic equipment with respect to a flight sequence of the space vehicle.

* * * * *